(12) United States Patent
Vimont et al.

(10) Patent No.: US 11,718,544 B2
(45) Date of Patent: Aug. 8, 2023

(54) FLOATING INDIVIDUALIZED AIR SUPPLY FOR WASTEWATER AERATION

(71) Applicant: Triplepoint Environmental LLC, Oak Park, IL (US)

(72) Inventors: Alex Vimont, Batavia, IL (US); Michael C. Wever, Dothan, AL (US); Braden J. Galbreath-O'Leary, Oak Park, IL (US); Patrick D. Hill, Forest Park, IL (US)

(73) Assignee: Triplepoint Environmental LLC, Oak Park, IL (US)

( * ) Notice: Subject to any disclaimer, the term of this patent is extended or adjusted under 35 U.S.C. 154(b) by 182 days.

(21) Appl. No.: 17/398,310

(22) Filed: Aug. 10, 2021

(65) Prior Publication Data

US 2022/0041481 A1 Feb. 10, 2022

Related U.S. Application Data

(60) Provisional application No. 63/063,585, filed on Aug. 10, 2020.

(51) Int. Cl.
*C02F 3/20* (2023.01)

(52) U.S. Cl.
CPC .......... *C02F 3/20* (2013.01); *C02F 2201/005* (2013.01)

(58) Field of Classification Search
CPC ............................. C02F 3/20; C02F 2201/005
USPC ......................................................... 210/620
See application file for complete search history.

(56) References Cited

U.S. PATENT DOCUMENTS

2011/0042309 A1* 2/2011 Keeton ............. B01F 35/32005
210/88

* cited by examiner

*Primary Examiner* — Claire A Norris
(74) *Attorney, Agent, or Firm* — United IP Counselors, LLC; Kenneth M. Fagin (57) ABSTRACT

A wastewater treatment facility with aerators located on the bottom of a lagoon features a bundled group of air supply lines to supply air individually to each submerged aerator. The bundled group of air supply lines floats—and may additionally be supported by a surface-anchored tether line—at the surface of the lagoon, and the air supply lines are individually supplied with air from a manifold located by the side of the lagoon.

5 Claims, 7 Drawing Sheets

FLOATING INDIVIDUALIZED AIR SUPPLY FOR WASTEWATER AERATION

CROSS-REFERENCE TO RELATED APPLICATIONS

The present application is based on and claims the priority benefit of U.S. provisional application 63/063,585 filed Aug. 10, 2020, the contents of which are incorporated herein by reference.

BACKGROUND AND FIELD OF THE INVENTION

The invention relates to aeration of wastewater treatment lagoons.

In general, it is known to hold wastewater in one or more treatment lagoons as part of a wastewater treatment process. The wastewater may be aerated using submerged aeration devices, such as Ares® aerators available from Triplepoint Environmental LLC of Oak Park, Ill., which are distributed in an array across the bottom of the lagoon. Air is supplied to the aerators by means of one or more blowers that are installed near the lagoons, at surface level. A header pipe, which receives air from a blower, is typically buried underground and runs along the side of the lagoon(s). A riser pipe or stub lateral line, which extends up from the header pipe and is accessible above ground, is provided to deliver air to a given row of aerators in the array.

In some known arrangements (not illustrated), a manifold is located at the end of the riser pipe, and an airline extends from the manifold, down along the sides of the lagoon, and along the bottom of the lagoon to each submerged aerator. Because the design objective in these installations is to keep the airlines submerged, the airlines need to be made from material that is heavy enough to overcome buoyancy attributable to being filled with air. Increased weight, however, implies increased thickness of the walls of the airline, and that, in turn, implies increased cost. (Typically, flexible PVC (e.g., "spa line") is used.) Additionally, as a rule of thumb, if there are more than about fifty aerators in a lagoon, it is not desirable to use such an arrangement because it becomes increasingly likely to snag other aerators if one aerator is being pulled out of the lagoon for service; for the various lines snaking across the bottom of the lagoon to become entangled; etc.

In that case (i.e., if there are more than about fifty aerators in the lagoon), another known arrangement 10 (illustrated in FIGS. 1, 1A-1C, and 2) typically is used. In this arrangement, a single lateral line 12 extends across the surface of the lagoon from the lateral stub pipe 14 and is kept at the surface of the lagoon either by simple floatation (due to the fact that the lateral line 12 is filled with air) or, if necessary, by means of a tensioning cable 16 extending across the lagoon and used to suspend the lateral line 12. In such an arrangement, the lateral line 12 can be on the order of six, eight, or even twelve inches in diameter, which makes it relatively heavy and difficult to manipulate.

Figure 1:
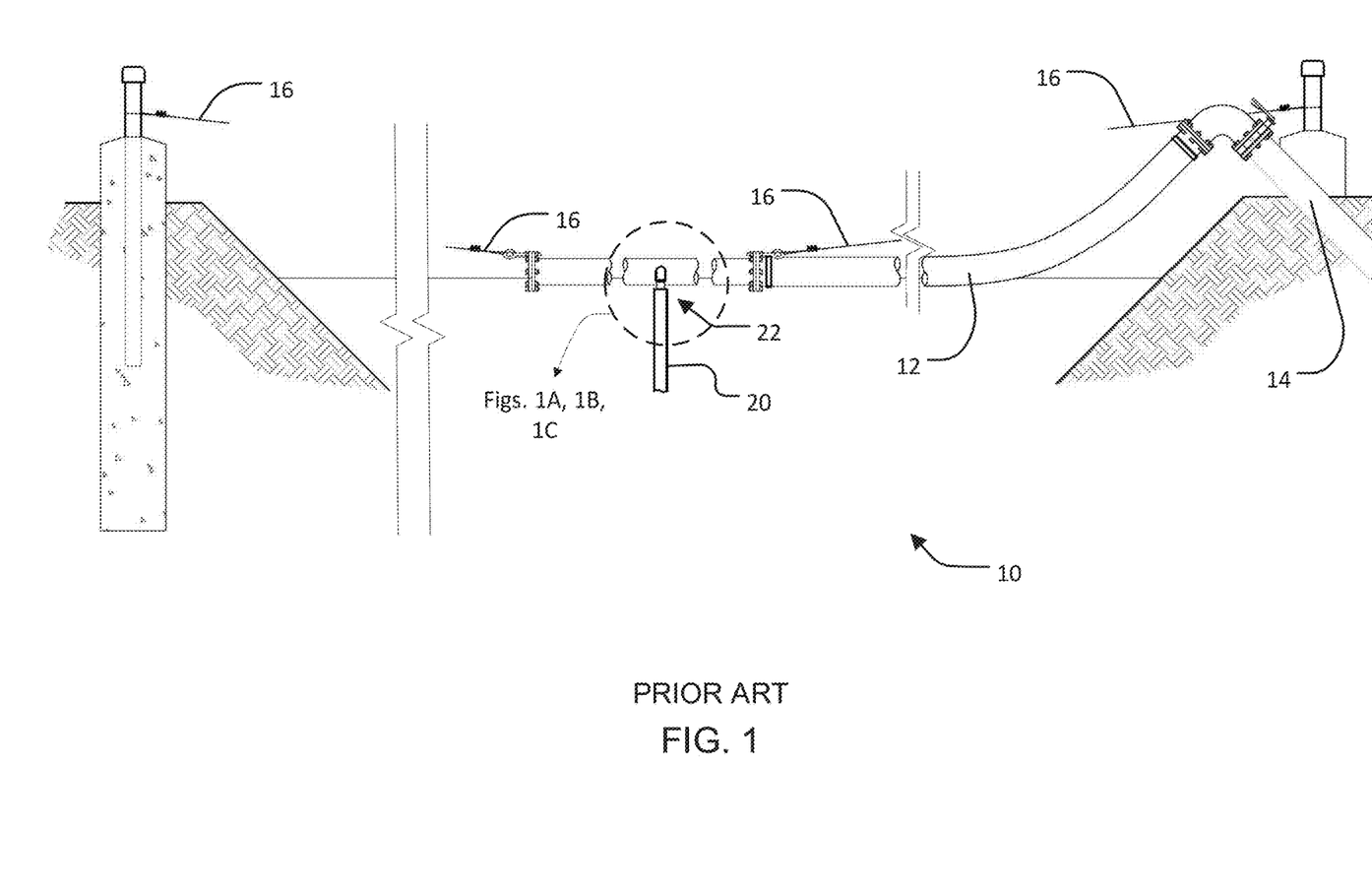
FIG. 1 is a schematic elevation view illustrating a wastewater treatment facility as known in the prior art, with FIGS. 1A, 1B, and 1C illustrating alternative air supply take-off points that may be employed in the circled location in FIG. 1.
Figure 1A:
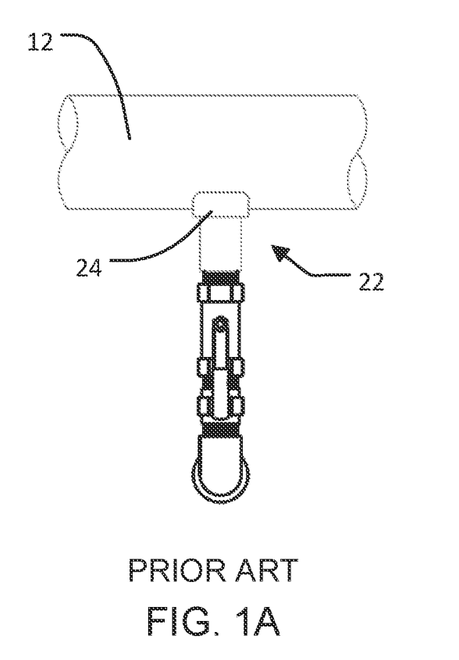
Figure 1B:
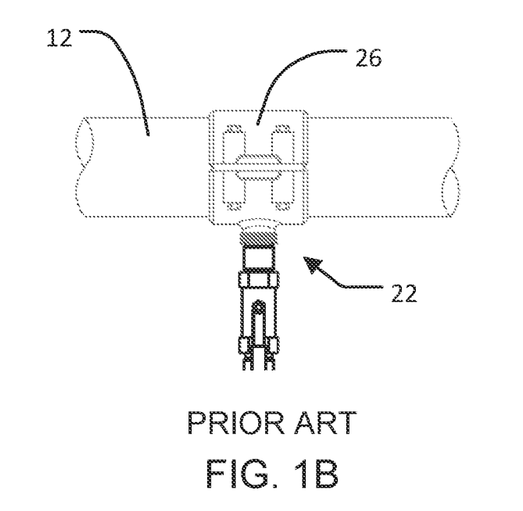
Figure 1C:
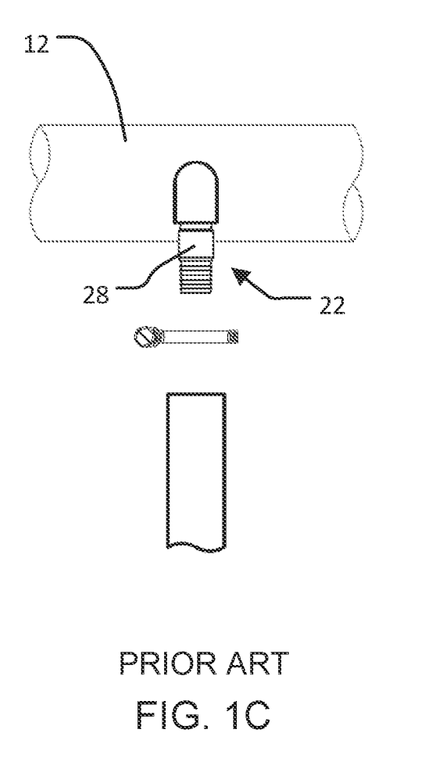
Figure 2:
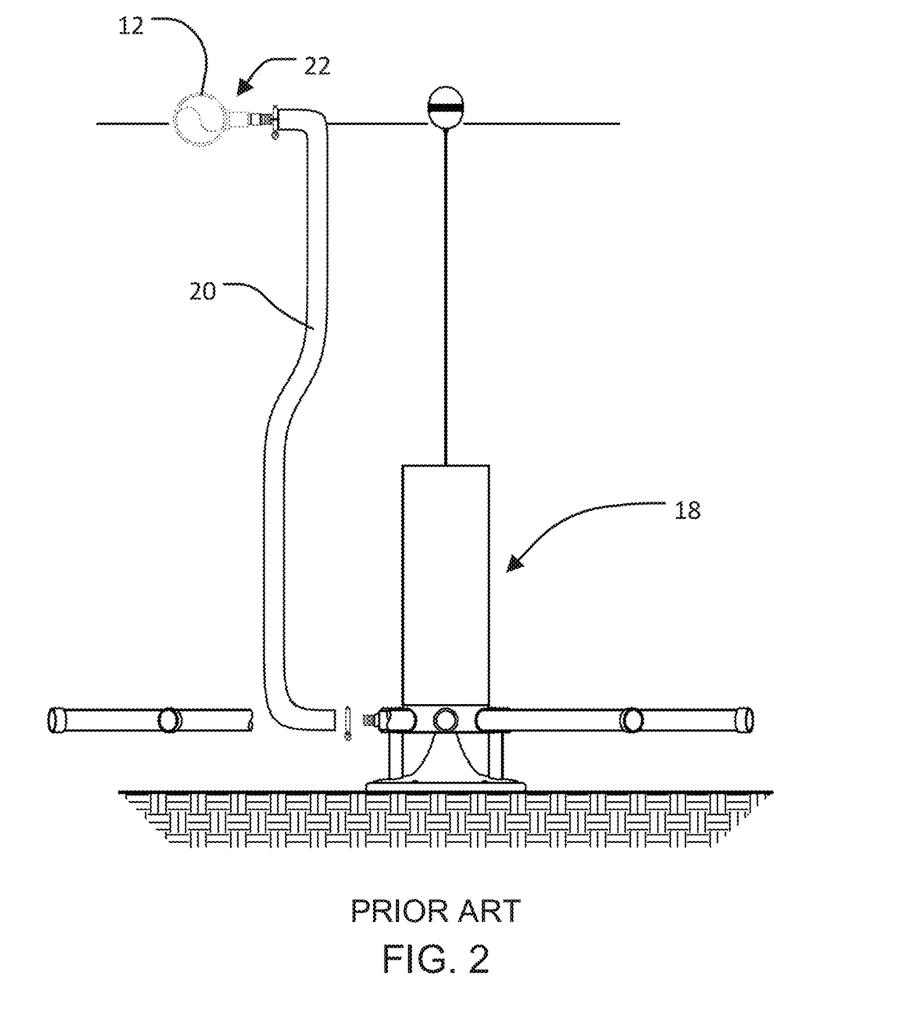
FIG. 2 is schematic elevation view (parts not to scale relative to each other) illustrating an air supply arrangement used to provide air to an aerator as used in the wastewater treatment facility shown in FIG. 1.
Figure 3:
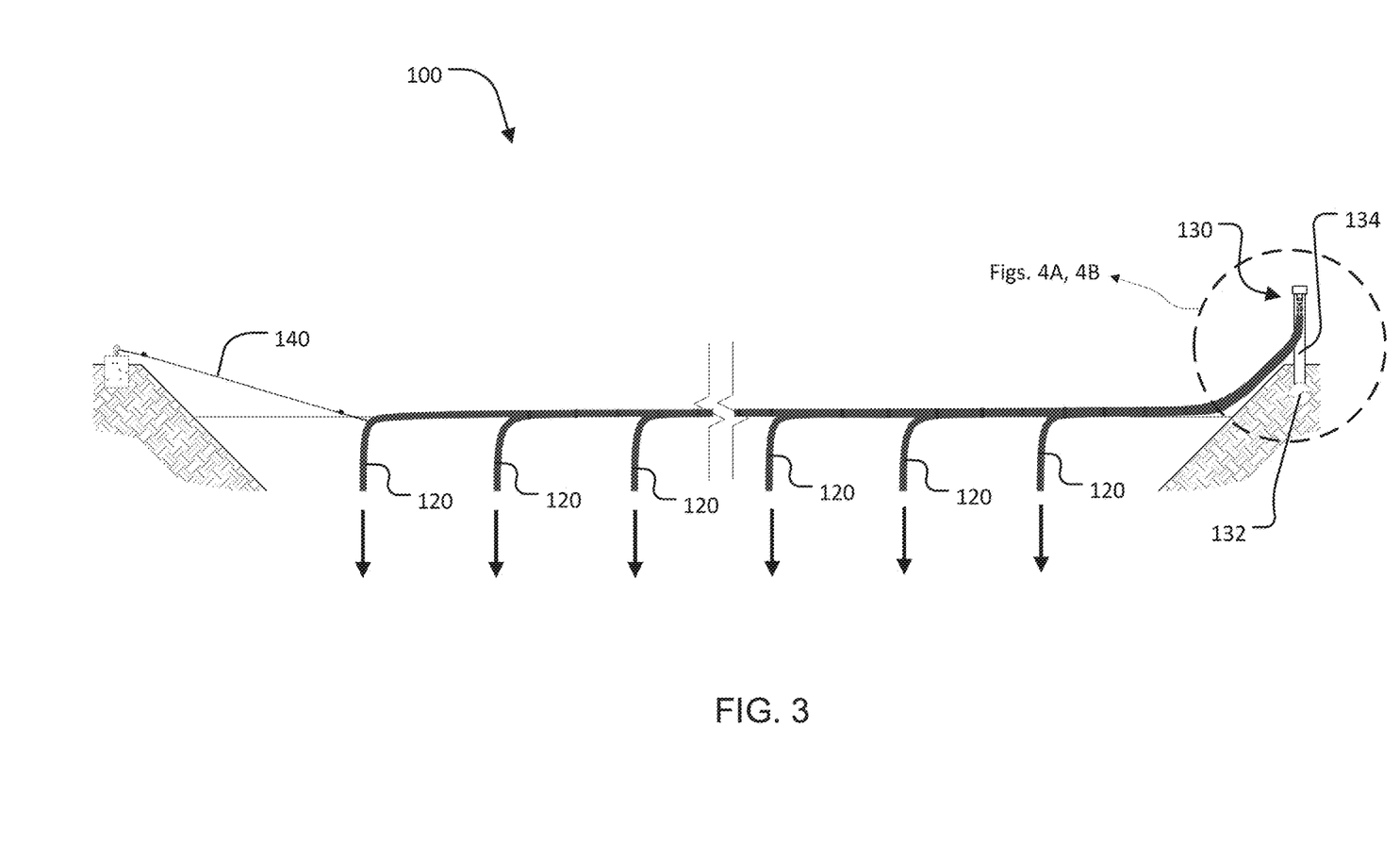
FIG. 3 is a schematic elevation view illustrating a floating individualized air supply assembly used in a wastewater treatment facility in accordance with the claimed invention.

Moreover, with this approach to providing air to the aerators 18, a separate air supply line 20—typically formed from flexible tubing (e.g., vinyl tubing)—needs to be connected to the main "trunk" lateral line 12 to supply air to each individual aerator 18. To accomplish this, a lateral take-off point 22 needs to be connected to the lateral line 12 at a position corresponding to the location of each of the aerators 18. Often, a hose barb-bearing "fusion saddle" 24, which conforms to the curvature of the lateral line 12, is attached to the lateral line 12 by forming a hole in the wall of the lateral line 12; heating mating surfaces of the saddle 24 and the lateral line 12 to soften the plastic material of each; and joining the parts together and allowing the plastic to reharden to fuse the parts together, as illustrated in FIG. 1A. Alternatively, a clamp-on style saddle 26 may be used as illustrated in FIG. 1B, or even a threaded hose barb 28 could be used as illustrated in FIG. 1C if the walls of the lateral line 12 are thick enough for threads with adequate extent to be formed. Regardless of which approach is used to provide the lateral take-off points 22, however, it is relatively difficult and labor-intensive to construct the take-off points 22, and this arrangement does not allow the amount of air flow to the individual aerators 18 to be set very easily. Additionally, the take-off points 22 may be prone to air leaks. In a worst-case scenario—particularly where a fusion saddle 24 is used—the take-off point 22 can detach from the lateral line 12, leaving a hole through which almost all air in the lateral line 12 will escape as the path of least resistance.

SUMMARY OF THE INVENTION

Embodiments of the inventive concept disclosed herein overcome these concerns by providing a bundled group of air supply lines to supply each submerged aerator individually, which bundled group of air supply lines floats—and may additionally be supported by a surface-anchored tether line—at the surface of the lagoon. Thus, in one aspect, the invention features a wastewater treatment facility with a lagoon and a plurality of aerators arranged in a row extending across the bottom of the lagoon. An air supply blower provides air for the aerators, and a manifold located by the lagoon receives air from the air supply blower. A bundle of air supply lines are arranged to supply air to the aerators in the row of aerators, with the bundle of air supply lines being located at the surface of the wastewater and with an individual air supply line extending 1) upwardly from each aerator in the row of aerators to the bundle of air supply lines and 2) along the bundle of air supply lines to the manifold to receive air from the manifold. The individual air supply lines in a given bundle may be held together to form the bundle by a two-strut clamping assembly.

In specific embodiments of the wastewater treatment facility, a valve may be associated with at least one air supply line in the bundle, by which valve the flow of air from the manifold to the aerator that is supplied by the particular air supply line may be regulated. Suitably, each air supply line in a given bundle and fed by the same manifold has its own individual valve. Additionally, in installations where the aerators are distributed across the bottom of the lagoon in multiple rows, each row of aerators has its own associated supply manifold.

BRIEF DESCRIPTION OF THE DRAWINGS

These concepts will be understood more fully from the following disclosure when read in conjunction with the figures, in which.

DETAILED DESCRIPTION OF EMBODIMENTS OF THE INVENTION

Figure 4A:
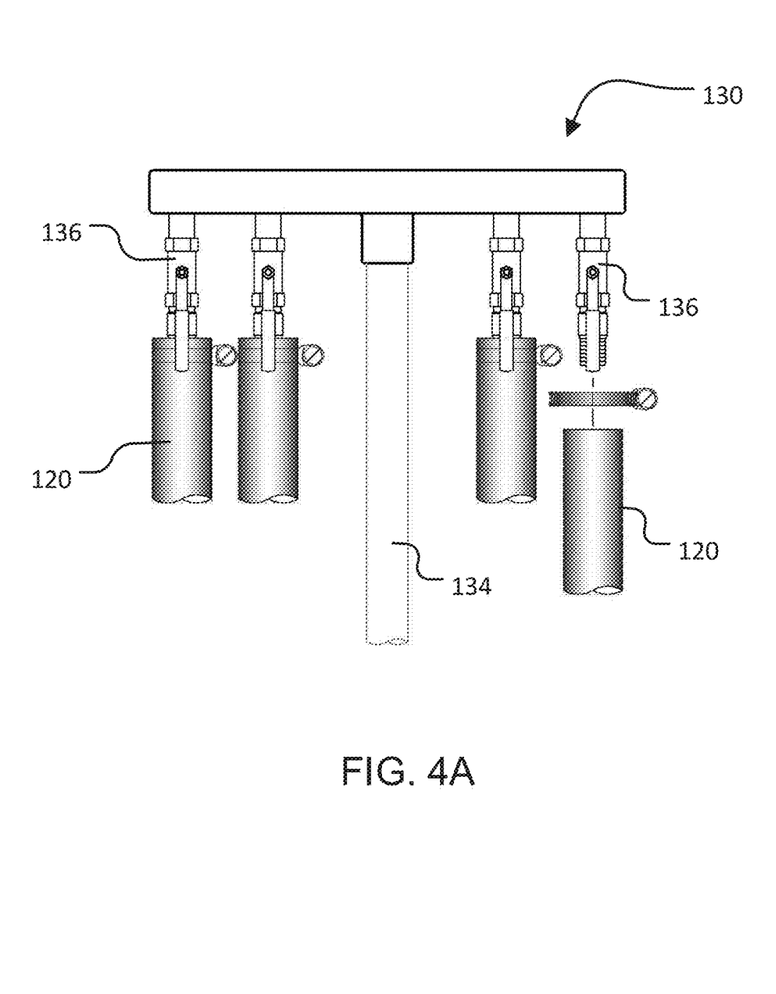
FIGS. 4A and 4B are an elevation view and a side view, respectively, of an air supply manifold that may be used to supply air to the floating individualized air supply assembly shown in FIG. 3.
Figure 4B:
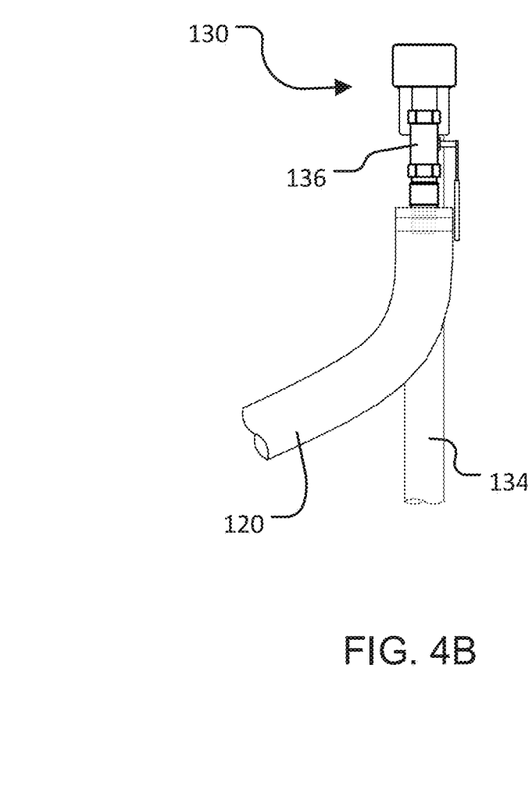

An embodiment 100 of a wastewater treatment facility in accordance with the claimed invention is illustrated in FIGS. 3, 4A, 4B, 5, 6, and 6A. According to this embodiment 100, air is supplied to each submerged aerator 118 (as indicated by the downward-facing arrows in FIG. 3) via an individual, dedicated air supply line 120, which is constructed from flexible tubing. Each air supply line is connected to a manifold 130 located near the side of a lagoon, with the manifold 130 receiving air from a buried header 132 (FIG. 3) via a riser pipe 134 (FIGS. 4A and 4B). Moreover, it is preferable for an isolation valve 136—e.g., a quarter-turn, stainless steel ball valve with a lever actuator—to be positioned between at least one (and preferably each) air supply line 120 and the manifold 130 to regulate (or even terminate) the amount of air being provided to the associated air supply line 120. Further still, a pressure gauge (not illustrated) may be provided for at least one (and preferably each) air supply line 120, to help regulate the amount of air being delivered into the associated individual air supply line 120. (Pressure may be kept higher in air supply lines that provide air to aerators 118 that are farther away to overcome greater flow resistance.)

As illustrated in FIGS. 3, 5, 6, and 6A, the air supply lines 120 to supply a given row of aerators are bundled together, with the bundle 138 being supported at the surface of the lagoon, e.g., by floatation alone or with supplemental support tether 140, if necessary. Where there are multiple rows of aerators 118 extending across the bottom of the lagoon, each row of aerators 118 may have its own associated bundle 138 of air supply lines 120 and its own associated supply manifold 130 to provide air to the aerators 118 in the given row. Each individual air supply line 120 "departs" or "takes off" from the bundle 138 and extends down to an aerator at the longitudinal position corresponding to the location of the aerator 118 to which the individual air supply line 120 supplies air. Thus, each individual air supply line 120 should be long enough to extend from the longitudinal location of the supplied aerator 118 to the supply manifold 130 and to extend down to the bottom of the lagoon, with enough slack in the downwardly extending portion of the air supply line 120 to prevent the aerator 118 from pulling the rest of the bundle 138 of air supply lines 120 down from the surface.

Figure 5:
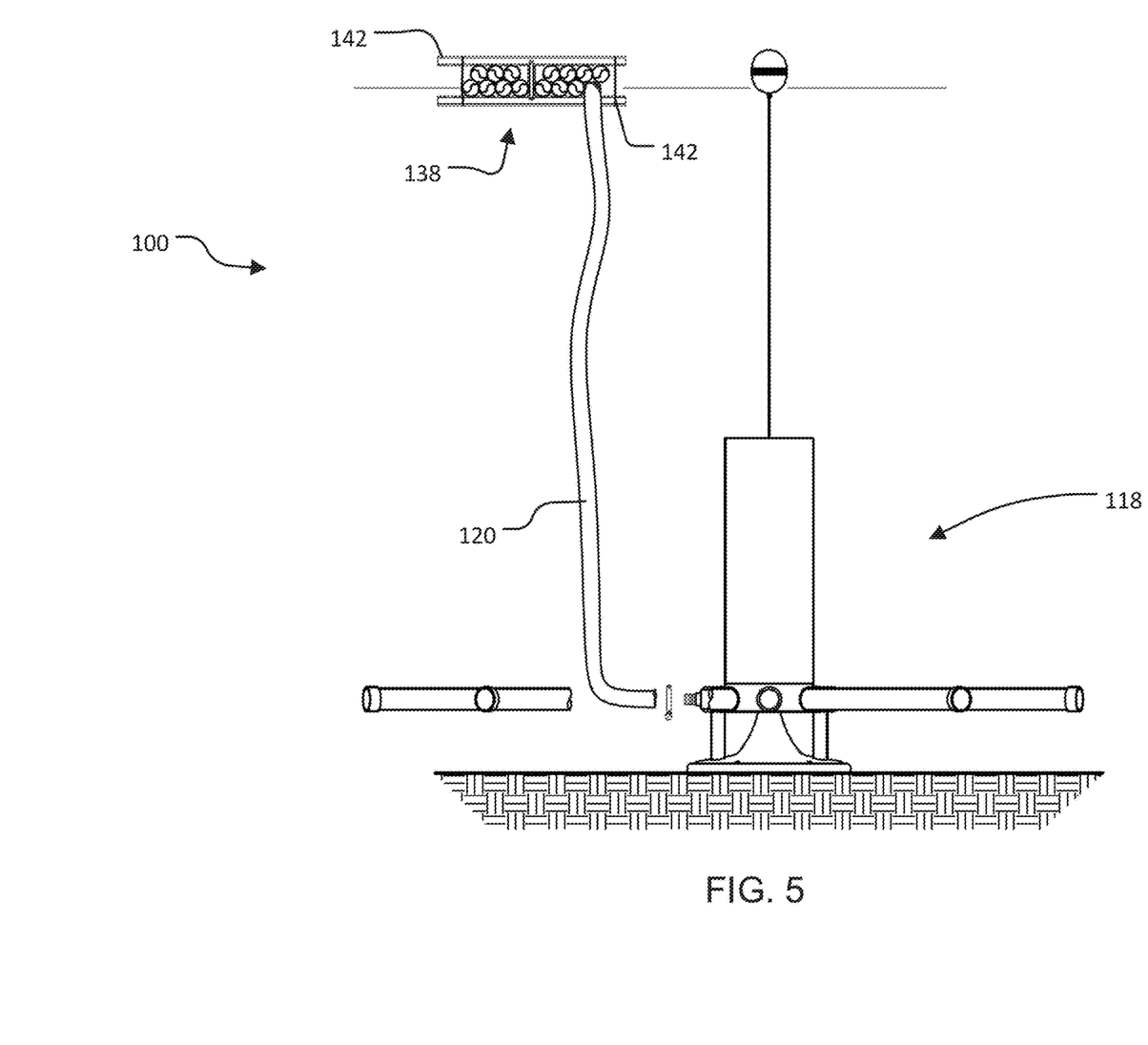
FIG. 5 is schematic elevation view (parts not to scale relative to each other) illustrating an air supply arrangement used to provide air to an aerator as used in a wastewater treatment facility in accordance with the invention.
Figure 6:
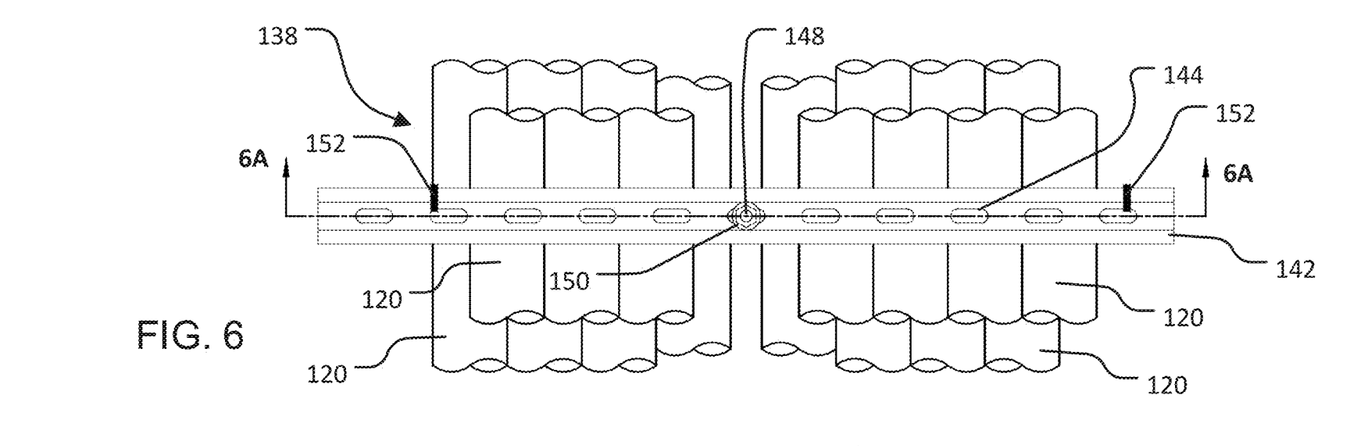
FIGS. 6 and 6A are a top view and a section view, respectively, illustrating a bundle of air supply lines used in the air supply arrangement shown in FIG. 5.
Figure 6A:
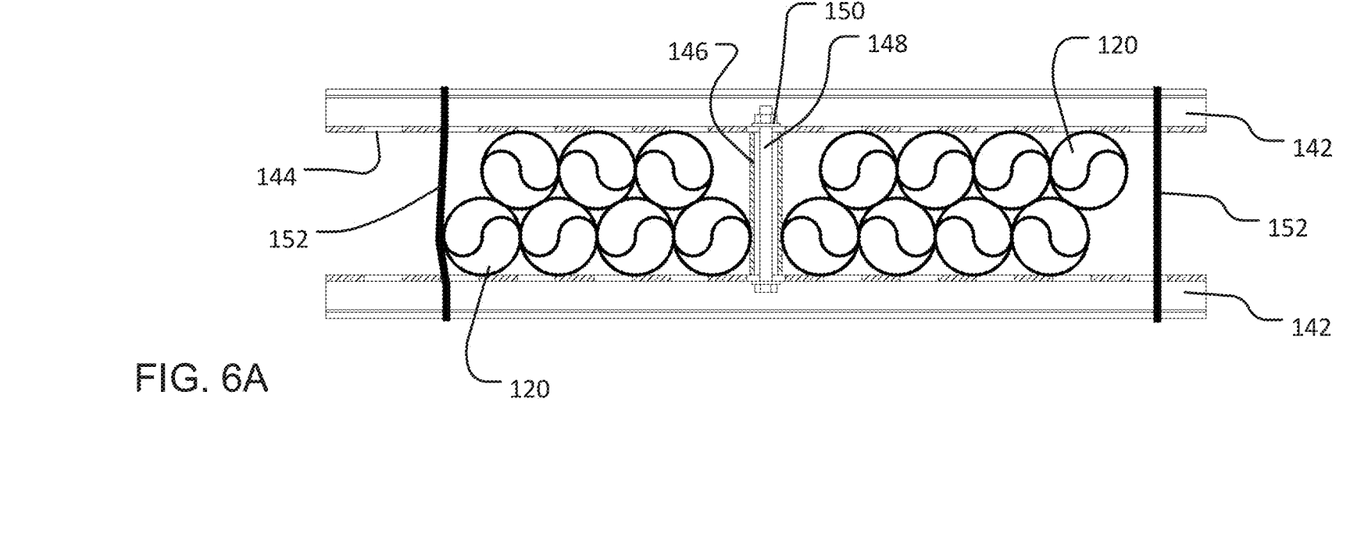

Furthermore, as best illustrated in FIGS. 5, 6, and 6A, the air supply lines 120 may be kept bundled together in a closely packed configuration using a two-strut "sandwich" assembly located at each of several locations along the length of the air supply lines 120, particularly at positions right before each of the individual air supply lines 120 descends from the bundle 138 to provide air to its associated aerator 118. Each "strut" 142 may be formed as a length of fiberglass C-shaped or U-shaped channel, which has slots 144 along the bottom of the channel. A length of tubing 146 (e.g., PVC pipe) can be provided between the two struts 142 to keep them spaced apart by an appropriate distance to prevent crushing of the air supply lines 120, and a bolt 148 can be passed through the tubing and secured (e.g., via a nut 150) to clamp the assembly together. Nylon cable ties 152 can be passed through the slots 144 of the struts 142 and secured to form a band located laterally "outboard" of each side of the bundle 138 of air supply lines 120, to keep the air supply lines 120 from falling out the sides of the bundled assembly. As fewer and fewer air supply lines 120 are bundled together as one progresses from the manifold 130 toward the end of a given row of aerators 118, the struts 142 used to form the sandwich assembly can be made shorter and shorter.

Suitably, the air supply lines 120 may be made from high-density polyethylene (HDPE). Given the density of this material, coupled with the fact that the air supply lines 120 will be filled with air, it generally should not be necessary to provide separate floats or tension wires to keep the bundles 138 of air supply lines 120 floating at the surface of the lagoon. As noted above, however, a support tether 140 that is anchored at the side of the lagoon may be provided if desired, e.g., to help support the bundle 138 of airlines 120 at the surface of the lagoon or, if nothing more, simply to help hold the position of the airlines 120 steady as they extend across the surface of the lagoon.

Various modifications to and departures from the disclosed embodiment will occur to those having skill in the art. The scope of the invention is defined by the following claims.

What is claimed is:

1. A wastewater treatment facility, comprising:
a lagoon containing wastewater and having a plurality of aerators arranged in a row extending across the bottom of the lagoon;
an air supply blower which provides air to the aerators;
a manifold located by the lagoon, which manifold receives air from the air supply blower;
a bundle of air supply lines formed from a plurality of individual air supply lines arranged to supply air to the aerators in the row of aerators, with the bundle of air supply lines being located at the surface of the wastewater and with one of said plurality of individual air supply lines extending 1) upwardly from each aerator in the row of aerators to join the bundle of air supply lines and 2) along the bundle of air supply lines, as a constituent member thereof, to the manifold to receive air from the manifold.

2. The wastewater treatment facility of claim 1, further comprising a valve associated with at least one of the plurality of individual air supply lines that form the bundle of air supply lines, by which valve the flow of air from the manifold to the aerator that is supplied by the individual air supply line with which the valve is associated is regulatable.

3. The wastewater treatment facility of claim 2, wherein each individual air supply line in the bundle of air supply lines has an individually associated valve by which the flow of air in each individual air supply line is individually regulatable.

4. The wastewater treatment facility of claim 1, wherein the plurality of aerators are arranged in a plurality of rows and wherein each given row of aerators of said plurality of rows has its own individually associated supply manifold to provide air to the aerators in the given row of aerators.

5. The wastewater treatment facility of claim 1, wherein the individual air supply lines that form the bundle of air supply lines are held together to form the bundle of air supply lines by a two-strut clamping assembly.

\* \* \* \* \*